United States Patent
Samie et al.

(10) Patent No.: US 8,758,183 B2
(45) Date of Patent: Jun. 24, 2014

(54) TRANSMISSION WITH DOUBLE-SUN, ONE RING, AND DOUBLE-ANNULAR GEAR COPLANAR GEAR SET

(71) Applicant: GM Global Technology Operations LLC, Detroit, MI (US)

(72) Inventors: Farzad Samie, Franklin, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/744,712

(22) Filed: Jan. 18, 2013

(65) Prior Publication Data

US 2013/0231212 A1    Sep. 5, 2013

Related U.S. Application Data

(60) Provisional application No. 61/606,125, filed on Mar. 2, 2012.

(51) Int. Cl.
*F16H 1/32* (2006.01)

(52) U.S. Cl.
USPC .......................................... 475/177

(58) Field of Classification Search
CPC ........ F16H 1/32; F16H 3/70; F16H 2001/323
USPC .................................. 475/177, 277
See application file for complete search history.

(56) References Cited

U.S. PATENT DOCUMENTS

| | | | | |
|---|---|---|---|---|
| 4,282,777 | A * | 8/1981 | Ryffel et al. | 475/159 |
| 4,762,025 | A * | 8/1988 | Lew | 475/175 |
| 7,235,030 | B2 * | 6/2007 | Becker et al. | 475/177 |
| 2002/0108832 | A1 | 8/2002 | Kerr | |
| 2010/0048346 | A1 | 2/2010 | Hoffman et al. | |
| 2011/0009228 | A1 | 1/2011 | Bauknecht et al. | |
| 2011/0009229 | A1 | 1/2011 | Bauknecht et al. | |

* cited by examiner

*Primary Examiner* — Edwin A Young
(74) *Attorney, Agent, or Firm* — Quinn Law Group, PLLC

(57) ABSTRACT

A transmission includes a first gear set with a first sun gear member rotatable about a first axis of rotation, a second sun gear member rotatable about the first axis of rotation, a carrier member, and a ring gear member radially outward of and concentric with the first sun gear member. A first annular gear meshes with the first sun gear member, and a second annular gear meshes with the first annular gear, the second sun gear member, and with the ring gear member. The first annular gear is rotatable about a second axis of rotation and the second annular gear is rotatable about a third axis or rotation.

16 Claims, 1 Drawing Sheet

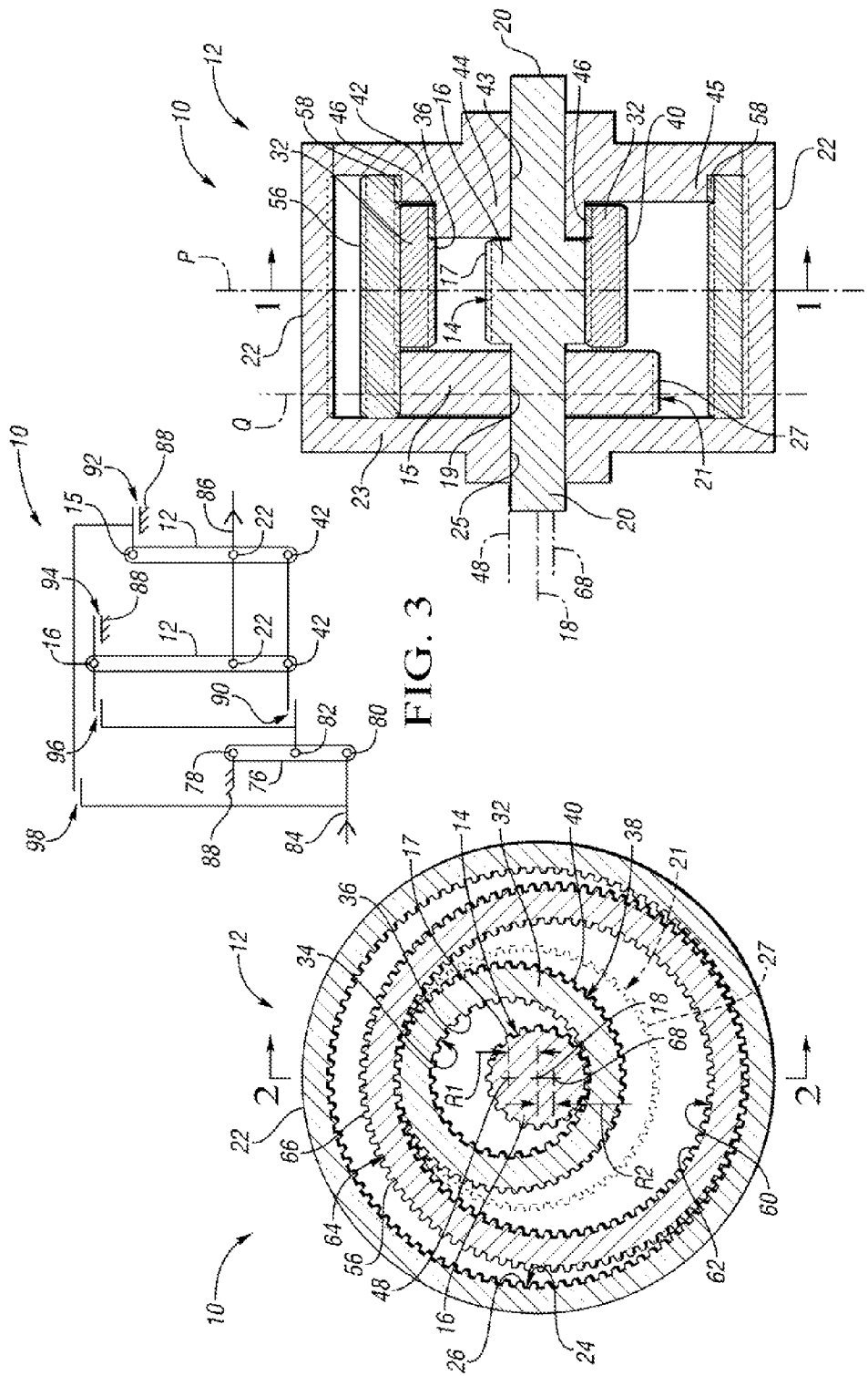

TRANSMISSION WITH DOUBLE-SUN, ONE RING, AND DOUBLE-ANNULAR GEAR COPLANAR GEAR SET

CROSS-REFERENCE TO RELATED APPLICATION

U.S. Provisional Application No. 61/606,125 filed on Mar. 2, 2012 is hereby incorporated by reference in its entirety.

TECHNICAL FIELD

The present teachings generally include transmissions that have a coplanar gear set.

BACKGROUND

Most passenger vehicles include a powertrain that has an engine, a multi-speed transmission, and a differential or final drive. The multi-speed transmission increases the overall operating range of the vehicle by permitting the engine to operate through its torque range a number of times. A primary focus of transmission and engine design is increasing vehicle fuel efficiency. Generally, an increased number of speed ratios provides greater fuel efficiency. However, it is challenging to package gear sets and selectively engageable torque-transmitting mechanisms to achieve the desired modes of operation while still meeting other applicable dimensional limitations and achieving relatively simple assembly requirements.

SUMMARY

A transmission is provided that has a coplanar gear set with two annular gears, two sun gear members, and a ring gear member, with a common carrier member. Specifically, the transmission includes a first gear set having a first sun gear member rotatable about a first axis of rotation. The first sun gear member has a radially outward-facing surface defining outer teeth. The transmission has a second sun gear member rotatable about the first axis of rotation. The second sun gear member has a radially outward-facing surface defining outer teeth. The transmission has a carrier member and a ring gear member. The ring gear member is radially outward of and concentric with the sun gear member and rotatable about the first axis of rotation. The ring gear member has a radially inward-facing surface defining inner teeth. A first annular gear is supported by the carrier member and has a radially inward-facing surface defining inner teeth and a radially outward-facing surface defining outer teeth. The first annular gear is rotatable about a second axis of rotation that rotates about the first axis of rotation. The inner teeth of the first annular gear mesh with the outer teeth of the first sun gear member. A second annular gear is supported by the carrier member and has a radially inward-facing surface defining inner teeth and a radially outward-facing surface defining outer teeth. The second annular gear is rotatable about a third axis of rotation that rotates about the first axis of rotation. The inner teeth of the second annular gear mesh with the outer teeth of the first annular gear and with the outer teeth of the second sun gear member, and the outer teeth of the second annular gear mesh with the inner teeth of the ring gear member.

By providing the coplanar gear set with another gear set that may or may not also be a coplanar gear set, axial space savings are achieved. Moreover, a coplanar gear set can achieve a wider gear set ratio range than a planetary gear set, has a high contact ratio, and has relatively quiet operation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic cross-sectional illustration of a portion of a first embodiment of a transmission including a coplanar gear set taken at lines 1-1 in FIG. 2.

FIG. 2 is a schematic cross-sectional illustration of the portion of the transmission of FIG. 1 taken at lines 2-2 in FIG. 1.

FIG. 3 is a schematic illustration in lever diagram form of the transmission of FIGS. 1 and 2 including a second gear set.

DETAILED DESCRIPTION

Referring to the drawings, wherein like reference numbers refer to like components throughout the several views, FIGS. 1 and 2 show a portion of a transmission 10 that includes a first gear set 12 that is a coplanar gear set. As used herein, a "coplanar gear set" is a gear set that includes an annular gear. As used herein, an "annular gear" is a gear that is generally cylindrical with radially inward-facing teeth (i.e., inner teeth) and radially outward-facing teeth (i.e., outer teeth) and has an axis of rotation that is offset from an axis of rotation of gears with which it meshes. An annular gear may also be referred to herein as a cluster gear. The annular gear meshes at both its inner and outer teeth with other members of the coplanar gear set.

The first gear set 12 has a first sun gear member 16 rotatable about a first axis of rotation 18. The first sun gear member 16 is mounted on and may be integrally formed with a center shaft 20. The first gear set 12 has a ring gear member 22 that is radially outward of and concentric with the first sun gear member 16. The ring gear member 22 has a hub 23 with a central opening 25 that receives the shaft 20. The ring gear member 22 is thus supported by the shaft 20 and symmetrically positioned about the shaft 20 so that the ring gear member 22 is rotatable about the first axis of rotation 18. The first sun gear member 16 has a radially-outward facing surface 14 defining outer teeth 17. The ring gear member 22 has a radially inward-facing surface 24 with inner teeth 26.

The first gear set 12 has a second sun gear member 15 with a central opening 19 that receives the shaft 20 so that the second sun gear member 15 is supported on the shaft 20. The second sun gear member 15 has a radially outward-facing surface 21 that defines outer teeth 27. The second sun gear member 15 is represented in phantom in FIG. 1 as it is not visible in the cross-section taken at the lines 1-1 in FIG. 2.

The first gear set 12 has a first annular gear 32 that has a radially inward-facing surface 34 with inner teeth 36 and a radially outward-facing surface 38 with outer teeth 40. The first gear set 12 also has a carrier member 42. The carrier member 42 has an inner opening 43 at which it is rotatably supported by the shaft 20. That is, the first carrier member 42 can rotate relative to the shaft 20 and the first sun gear member 16. The carrier member 42 also has a generally cylindrical first hub 44 that is not centered with the first axis of rotation 18. That is, the first hub 44 is an eccentric hub. The first annular gear 32 is supported by the first hub 44 of the carrier member 42 at a first set of cluster bearings 46 so that the first annular gear 32 is rotatable relative to the hub 44. Because the hub 44 is not centered with the first axis of rotation, the first annular gear 32 has a second axis of rotation 48 that is offset from the first axis of rotation 18. Specifically, the first annular gear 32 will rotate around the second axis of rotation 48, and as the first annular gear 32 moves the second axis of rotation 48 will rotate around the first axis of rotation 18 in a circle with a radius R1 that is equal to the distance by which the second axis of rotation 48 is offset from the first axis of rotation 18.

The first gear set 12 has a second annular gear 56 that has a radially inward-facing surface 60 with inner teeth 62 and a radially outward-facing surface 64 with outer teeth 66. The carrier member 42 also has a generally cylindrical second hub 45 that is not centered with the first axis of rotation 18. That is, the second hub 45 is an eccentric hub. The second annular gear 56 is supported by the second hub 45 of the carrier member 42 at a second set of cluster bearings 58 so that the second annular gear 56 is rotatable relative to the second hub 45. Both the first annular gear 32 and the second annular gear 56 are thus supported by a single, common carrier member 42. As is apparent in FIG. 2, the first hub 44 extends axially from the second hub 45. Because the second hub 45 is not centered with the first axis of rotation 18 or with the second axis of rotation 48, the second annular gear 56 has a third axis of rotation 68 that is offset from the first axis of rotation 18. Specifically, the second annular gear 56 will rotate around the third axis of rotation 68, and as the second annular gear 56 moves the third axis of rotation 68 will rotate around the first axis of rotation 18 in a circle with a radius R2 that is equal to the distance by which the third axis of rotation 68 is offset from the first axis of rotation 18.

The inner teeth 36 of the first annular gear 32 mesh with the outer teeth 17 of the first sun gear member 16. The outer teeth 40 of the first annular gear 32 mesh with the inner teeth 62 of the second annular gear 56. The outer teeth 27 of the second sun gear member 15 also mesh with the inner teeth 62 of the second annular gear 56. The outer teeth 66 of the second annular gear 56 mesh with the inner teeth 26 of the ring gear member 22. The hub 23 of the ring gear member 22 is positioned so that the second sun gear member 15 is positioned axially between the hub 23 of the ring gear member 22 and the first sun gear member 16, and the first sun gear member 16 is positioned axially between the second sun gear member 15 and the carrier member 42. The second sun gear member 15 is radially surrounded by the second annular gear 56 and the ring gear member 22, and the first sun gear member 16 is radially surrounded by the first annular gear 32, the second annular gear 56, and the ring gear member 22.

As is apparent in FIG. 2, because the first gear set 12 is a coplanar gear set, a radial plane P perpendicular to the first axis of rotation 18 and placed through the first gear set 12 intersects the first sun gear member 16, the first annular gear 32, the second annular gear 56, and the ring gear member 22, so that the meshing of the first sun gear member 16 with the first annular gear 32, meshing of the first annular gear 32 with the second annular gear 56, and meshing of the second annular gear 56 with the ring gear member 22 all occur in the single radial plane P. Meshing of the second sun gear member 15, the second annular gear 56, and the ring gear member 22 occurs in a single radial plane Q.

The first gear set 12 can be used within the transmission 10 along with various selectively engageable torque-transmitting mechanisms to provide multiple speed ratios in a relatively compact axial space. That is, because the first gear set 12 is a coplanar gear set, the axial width occupied by the first gear set 12 is less than the axial width that would be required for two axially-adjacent, simple planetary gear sets that may be necessary to provide the ratio range available with the first gear set 12, potentially reducing weight and increasing fuel economy. Axial space savings, wide gear set ratio range, high contact ratio, and quiet operation can also be achieved.

The speed relationship between the members of the first gear set 12 is as follows:

$$w_{s1}=((1/k_1)*w_r)+(((k_1-1)/k_1)*w_c);$$

and $$k_1=(A_1CE)/(BDF);$$

where $w_{s1}$ is the rotational speed in revolutions per minute (rpm) of the first sun gear member 16; $w_r$ is the rotational speed in rpm of the ring gear member 22, $w_c$ is the rotational speed in rpm of the carrier member 42; A is the number of teeth 17 of the first sun gear member 16; B is the number of inner teeth 36 of the first annular gear 32; C is the number of outer teeth 40 of the first annular gear 32; D is the number of inner teeth 62 of the second annular gear 56, E is the number of outer teeth 66 of the second annular gear 56, and F is the number of inner teeth 26 of the first ring gear member 22.

The speed relationship between the members of the second gear set 14 is as follows:

$$w_{s2}=((1/k_2)*w_r)+(((k_2-1)/k_2)*w_c);$$

and $$k_2=(A_2E)/(DF);$$

where $w_{s2}$ is the rotational speed in revolutions per minute (rpm) of the second sun gear member 15; $w_r$ is the rotational speed in rpm of the ring gear member 22, $w_c$ is the rotational speed in rpm of the carrier member 42; $A_2$ is the number of teeth 27 of the second sun gear member 15; D is the number of inner teeth 62 of the second annular gear 56, E is the number of outer teeth 66 of the second annular gear 56, and F is the number of inner teeth 26 of the first ring gear member 22.

FIG. 3 shows the transmission 10 including the first gear set 12 and a second gear set 76. The first gear set 12 and the second gear set 76 are illustrated in lever diagram form as will be understood by a person of ordinary skill in the art. Specifically, in a lever diagram, the members of each gear set are represented as nodes on a lever. Nodes of different levers that are interconnected, either continuously or selectively, rotate at the same speed and function as a single node. As used herein, components of gear sets that are interconnected rotate at the same speed. The distance between each of the nodes on a lever is determined by the number of teeth of the gear members of the gear set represented by the lever. The first gear set 12 is represented as two levers each having a respective one of the sun gear members 15, 16 and each having the common ring gear member 22 and common carrier member 42. Although shown in two levers, the ring gear member 22 is a single node and the carrier member 42 is a single node. The first gear set 12 could alternatively be drawn as a single four node lever.

The second gear set 76 has a sun gear member 78, a ring gear member 80, and a carrier member 82. A set of planetary gears can mesh both with the ring gear member 80 and the sun gear member 78, so that the second gear set 76 is a planetary gear set. Alternatively, an annular gear can mesh with both the sun gear member 78 and the ring gear member 80 so that the second gear set 76 is a coplanar gear set that can be stacked with the first gear set 12.

The sun gear member 78 of the second gear set 76 is continuously grounded to a stationary member 88. As used herein, a "stationary member" is a non-rotating member. The stationary member 88 can be a transmission housing. The transmission 10 has an input member 84 continuously interconnected with the ring gear member 80 of the second gear set 76, and an output member 86 continuously interconnected with the ring gear member 22 of the first gear set 12. As used herein, two components are "interconnected" when a rigid interconnection between the two components causes the two components to rotate commonly, i.e., rotate at the same speed as one another.

The transmission 10 has five selectively engageable torque-transmitting mechanisms 90, 92, 94, 96, and 98. The torque-transmitting mechanisms include a first torque-transmitting mechanism 90 that is selectively engageable to interconnect the carrier member 42 of the first gear set 12 to the carrier member 82 of the second gear set 76. A second torque-transmitting mechanism 92 is selectively engageable to ground the second sun gear member 15 to the stationary member 88. A third torque-transmitting mechanism 94 is selectively engageable to ground the first sun gear member 16 to the stationary member 88. A fourth torque-transmitting mechanism 96 is selectively engageable to interconnect the carrier member 82 of the second gear set 76 to the first sun gear member 16. A fifth torque-transmitting mechanism 98 is selectively engageable to interconnect the input member 84 with the the second sun gear member 15.

The five torque-transmitting mechanisms 90, 92, 94, 96, and 98 are selectively engaged in different combinations to establish six numerically different forward speed ratios and a reverse speed ratio of the input member 84 to the output member 86. A reverse speed ratio of the input member 84 to the output member 86 is established by engaging the second torque-transmitting mechanism 92 and the fourth torque-transmitting mechanism 96. A neutral state is established by engaging only the second torque-transmitting mechanism 92. A first forward speed ratio of the input member 84 to the output member 86 is established by engaging the first torque-transmitting mechanism 90 and the second torque-transmitting mechanism 92. A second forward speed ratio of the input member 84 to the output member 86 is established by engaging the first torque-transmitting mechanism 90 and the third torque-transmitting mechanism 94. A third forward speed ratio of the input member 84 to the output member 86 is established by engaging the first torque-transmitting mechanism 90 and the fourth torque-transmitting mechanism 96. A fourth forward speed ratio of the input member 84 to the output member 86 is established by engaging the first torque-transmitting mechanism 90 and the fifth torque-transmitting mechanism 98. A fifth forward speed ratio of the input member 84 to the output member 86 is established by engaging the fourth torque-transmitting mechanism 96 and the fifth torque-transmitting mechanism 98. A sixth forward speed ratio of the input member 84 to the output member 86 is established by engaging the third torque-transmitting mechanism 94 and the fifth torque-transmitting mechanism 98.

Transitions between each of the subsequent forward speed ratios are single transition shifts. One of the torque-transmitting mechanisms remains engaged during immediate subsequent ratios (i.e., first to second forward speed ratio, second to third forward speed ratio, third to fourth forward speed ratio, fourth to fifth forward speed ratio, and fifth to sixth forward speed ratio) while the engagement status of one other torque-transmitting mechanism changes. Additional speed ratios can be established by adding either or both of one or more additional gear sets and one or more additional torque-transmitting mechanisms (i.e., clutches or brakes) to the transmission 10.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a first gear set having:
   a first sun gear member rotatable about a first axis of rotation; wherein the first sun gear member has a radially outward-facing surface defining outer teeth;
   a second sun gear member rotatable about the first axis of rotation; wherein the second sun gear member has a radially outward-facing surface defining outer teeth;
   a carrier member;
   a ring gear member radially outward of and concentric with the first sun gear member and the second sun gear member and rotatable about the first axis of rotation; wherein the ring gear member has a radially inward-facing surface defining inner teeth;
   a first annular gear supported by the carrier member and having a radially inward-facing surface defining inner teeth and a radially outward-facing surface defining outer teeth; wherein the first annular gear is rotatable about a second axis of rotation that rotates about the first axis of rotation; wherein the inner teeth of the first annular gear mesh with the outer teeth of the first sun gear member;
   a second annular gear supported by the carrier member and having a radially inward-facing surface defining inner teeth and a radially outward-facing surface defining outer teeth; wherein the second annular gear is rotatable about a third axis of rotation that rotates about the first axis of rotation; and wherein the inner teeth of the second annular gear mesh with the outer teeth of the first annular gear and with the outer teeth of the second sun gear member, and the outer teeth of the second annular gear mesh with the inner teeth of the ring gear member.

2. The transmission of claim 1, further comprising:
a first set of cluster bearings positioned between the first annular gear and the carrier member to permit relative rotation thereof; and
a second set of cluster bearings positioned between the second annular gear and the carrier member to permit relative rotation thereof.

3. The transmission of claim 1, further comprising:
a shaft extending from the first sun gear member; wherein the carrier member has an opening through which the shaft extends and is rotatably supported by the carrier member to establish the first axis of rotation;
wherein the carrier member has a first eccentric hub supporting the first annular gear to define the second axis of rotation; and
wherein the carrier member has a second eccentric hub supporting the second annular gear to define the third axis of rotation.

4. The transmission of claim 3, wherein the first eccentric hub extends axially from the second eccentric hub.

5. The transmission of claim 3, wherein the second sun gear member has an opening through which the shaft extends and is rotatably supported by the second sun gear member; and wherein the first sun gear member is positioned axially between the second sun gear member and the carrier member.

6. The transmission of claim 1, further comprising:
a second gear set having a sun gear member, a ring gear member, and a carrier member;

a stationary member;
wherein the sun gear member of the second gear set is continuously grounded to the stationary member;
an input member continuously interconnected with the ring gear member of the second gear set;
an output member continuously interconnected with the ring gear member of the first gear set;
five torque-transmitting-mechanisms including:
- a first torque-transmitting mechanism selectively engageable to interconnect the carrier member of the first gear set with the carrier member of the second gear set;
- a second torque-transmitting mechanism selectively engageable to ground the second sun gear member of the first gear set to the stationary member;
- a third torque-transmitting mechanism selectively engageable to ground the first sun gear member of the first gear set to the stationary member;
- a fourth torque-transmitting mechanism selectively engageable to interconnect the first sun gear member of the first gear set to the carrier member of the second gear set;
- a fifth torque-transmitting mechanism selectively engageable to interconnect the input member with the second sun gear member of the first gear set; and wherein the five torque-transmitting mechanisms are selectively engageable in different combinations to establish six forward speed ratios and a reverse speed ratio of the input member to the output member.

7. The transmission of claim 6, wherein shifts between adjacent ones of the six forward speed ratios are single transition shifts.

8. A transmission comprising:
a first gear set having:
- a first sun gear member rotatable about a first axis of rotation; wherein the first sun gear member has a radially outward-facing surface defining outer teeth;
- a second sun gear member rotatable about the first axis of rotation; wherein the second sun gear member has a radially outward-facing surface defining outer teeth;
- a carrier member having a first eccentric hub and a second eccentric hub defining a second axis of rotation and a third axis of rotation, respectively;
- a ring gear member radially outward of and concentric with the first sun gear member and the second sun gear member and rotatable about the first axis of rotation; wherein the ring gear member has a radially inward-facing surface defining inner teeth;
- a first annular gear supported by the carrier member on the first eccentric hub and having a radially inward-facing surface defining inner teeth and a radially outward-facing surface defining outer teeth; wherein the first annular gear is rotatable about the second axis of rotation; wherein the inner teeth of the first annular gear mesh with the outer teeth of the first sun gear member;
- a second annular gear supported by the carrier member on the second eccentric hub and having a radially inward-facing surface defining inner teeth and a radially outward-facing surface defining outer teeth; wherein the second annular gear is rotatable about the third axis of rotation; wherein the inner teeth of the second annular gear mesh with the outer teeth of the first annular gear and the outer teeth of the second sun gear member, and the outer teeth of the second annular gear mesh with the inner teeth of the ring gear member;

wherein meshing of the first sun gear member with the first annular gear, meshing of the first annular gear with the second annular gear, and meshing of the second annular gear with the ring gear member all occur in a first plane that is perpendicular to the first axis of rotation; and
wherein meshing of the second sun gear member with the second annular gear, and meshing of the second annular gear with the ring gear member occur in a second plane that is perpendicular to the first axis of rotation.

9. The transmission of claim 8, further comprising:
a first set of cluster bearings positioned between the first annular gear and the carrier member to permit relative rotation thereof; and
a second set of cluster bearings positioned between the second annular gear and the carrier member to permit relative rotation thereof.

10. The transmission of claim 8, further comprising:
a shaft extending from the first sun gear member; wherein the carrier member has an opening in which the shaft is rotatably supported to establish the first axis of rotation.

11. The transmission of claim 10, wherein the ring gear member has a hub with an opening in which the shaft is rotatably supported so that the first sun gear member and the second sun gear member are positioned axially between the carrier member and the hub of the ring gear member.

12. The transmission of claim 8, wherein the first eccentric hub extends axially from the second eccentric hub.

13. The transmission of claim 8, further comprising:
a second gear set having a sun gear member, a ring gear member, and a carrier member;
a stationary member;
wherein the sun gear member of the second gear set is continuously grounded to the stationary member;
an input member continuously interconnected with the ring gear member of the second gear set;
an output member continuously interconnected with the ring gear member of the first gear set;
five torque-transmitting mechanisms including:
- a first torque-transmitting mechanism selectively engageable to interconnect the carrier member of the first gear set with the carrier member of the second gear set;
- a second torque-transmitting mechanism selectively engageable to ground the second sun gear member of the first gear set to the stationary member;
- a third torque-transmitting mechanism selectively engageable to ground the first sun gear member of the first gear set to the stationary member;
- a fourth torque-transmitting mechanism selectively engageable to interconnect the first sun gear member of the first gear set to the carrier member of the second gear set;
- a fifth torque-transmitting mechanism selectively engageable to interconnect the input member with the second sun gear member of the first gear set; and wherein the five torque-transmitting mechanisms are selectively engageable in different combinations to establish six forward speed ratios and a reverse speed ratio of the input member to the output member.

14. The transmission of claim 13, wherein shifts between adjacent ones of the six forward speed ratios are single transition shifts.

15. A transmission comprising:
a first gear set having:
- a first sun gear member rotatable about a first axis of rotation; wherein the first sun gear member has a radially outward-facing surface defining outer teeth;

a second sun gear member rotatable about the first axis of rotation; wherein the second sun gear member has a radially outward-facing surface defining outer teeth;

a carrier member;

a ring gear member radially outward of and concentric with the first sun gear member and the second sun gear member, and rotatable about the first axis of rotation; wherein the ring gear member has a radially inward-facing surface defining inner teeth;

a first annular gear supported by the carrier member and having a radially inward-facing surface defining inner teeth and a radially outward-facing surface defining outer teeth; wherein the first annular gear is rotatable about a second axis of rotation that rotates about the first axis of rotation; wherein the inner teeth of the first annular gear mesh with the outer teeth of the first sun gear member;

a second annular gear supported by the carrier member and having a radially inward-facing surface defining inner teeth and a radially outward-facing surface defining outer teeth; wherein the second annular gear is rotatable about a third axis of rotation that rotates about the first axis of rotation; and wherein the inner teeth of the second annular gear mesh with the outer teeth of the first annular gear and the outer teeth of the second sun gear member, and the outer teeth of the second annular gear mesh with the inner teeth of the ring gear member;

a first set of cluster bearings positioned between the first annular gear and the carrier member to permit relative rotation thereof;

a second set of cluster bearings positioned between the second annular gear and the carrier member to permit relative rotation thereof;

a second gear set having a ring gear member, a carrier member, and a sun gear member;

an input member continuously interconnected with the ring gear member of the second gear set;

an output member continuously interconnected with the ring gear member of the first gear set;

a stationary member;

five torque-transmitting mechanisms including:
- a first torque-transmitting mechanism selectively engageable to interconnect the carrier member of the first gear set with the carrier member of the second gear set;
- a second torque-transmitting mechanism selectively engageable to ground the second sun gear member of the first gear set to the stationary member;
- a third torque-transmitting mechanism selectively engageable to ground the first sun gear member of the first gear set to the stationary member;
- a fourth torque-transmitting mechanism selectively engageable to interconnect the first sun gear member of the first gear set to the carrier member of the second gear set;
- a fifth torque-transmitting mechanism selectively engageable to interconnect the input member with the second sun gear member of the first gear set; and wherein the five torque-transmitting mechanisms are selectively engageable in different combinations to establish six forward speed ratios and a reverse speed ratio of the input member to the output member.

16. The transmission of claim 15, wherein shifts between adjacent ones of the five forward speed ratios are single transition shifts.

* * * * *